United States Patent
Pazhyannur et al.

(10) Patent No.: US 8,731,536 B2
(45) Date of Patent: May 20, 2014

(54) AUTOMATED LAC ASSIGNMENTS FOR ENTERPRISE FEMTOS

(75) Inventors: Rajesh Pazhyannur, Milpitas, CA (US); Anton Okmyanskiy, Vancouver (CA); Mickael Graham, Bellevue Hill (AU)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 12/900,437

(22) Filed: Oct. 7, 2010

(65) Prior Publication Data

US 2012/0088482 A1    Apr. 12, 2012

(51) Int. Cl.
*H04M 3/00* (2006.01)

(52) U.S. Cl.
USPC ........... 455/418; 455/445; 455/461; 455/411; 455/419

(58) Field of Classification Search
USPC .................................. 455/419, 561
See application file for complete search history.

(56) References Cited

U.S. PATENT DOCUMENTS

| | | | |
|---|---|---|---|
| 2003/0109254 A1* | 6/2003 | Motegi et al. .................. | 455/435 |
| 2005/0148368 A1* | 7/2005 | Scheinert et al. ............. | 455/561 |
| 2005/0255890 A1* | 11/2005 | Nakada .......................... | 455/561 |
| 2007/0270152 A1* | 11/2007 | Nylander et al. ............. | 455/445 |
| 2008/0207170 A1* | 8/2008 | Khetawat et al. ............. | 455/411 |
| 2009/0181688 A1* | 7/2009 | Claussen et al. ............. | 455/450 |
| 2010/0067482 A1* | 3/2010 | Vikberg et al. ............... | 370/331 |

FOREIGN PATENT DOCUMENTS

| | | |
|---|---|---|
| EP | 2 079 258 A1 | 7/2009 |
| FR | 2 907 290 A1 | 4/2008 |

OTHER PUBLICATIONS

English machine translation of FR2907290 A1 originally submitted to the USPTO in foreign language on IDS filed Jan. 5, 2012.
International Search Report and Written Opinion dated Feb. 8, 2012 for the related International Patent Application No. PCT/US2011/054161.
PCT/US11/54161 Invitation to Pay Additional Fees and Results of the Partial International Search, Dec. 2, 2011.
PCT/US11/54161 International Preliminary Report on Patentability and the Written Opinion of the International Searching Authority dated Apr. 9, 2013.

* cited by examiner

*Primary Examiner* — David Q Nguyen
(74) *Attorney, Agent, or Firm* — Tucker Ellis LLP

(57) ABSTRACT

In accordance with an example embodiment, there is disclosed herein an apparatus comprising an interface, and processing logic coupled with the interface. The processing logic receives via the interface a list of location area codes detected by an access point associated with a site group to be provisioned with a location area code (LAC). The processing logic removes from a predefined list of location area codes the location area codes detected by the access point. The processing logic selects a LAC from the predefined list for the site group after removing the location area codes detected by the access point. The processing logic provisions the access point with the selected LAC via the interface.

24 Claims, 5 Drawing Sheets

AUTOMATED LAC ASSIGNMENTS FOR ENTERPRISE FEMTOS

TECHNICAL FIELD

The present disclosure relates generally to enterprise Femto deployments.

BACKGROUND

Femtocell is an emerging technology targeted for 3G/4G technologies such as a Universal Mobile Telecommunication System (UMTS), Code Division Multiplex Access (CDMA) systems, WiMax™ systems and Long Term Evolution (LTE) systems. Femtocells access points (AP) are radio access point devices that serve as mini cell tower devices to improve coverage of service to wireless user devices and offload mobile infrastructure of the mobile service provider by utilizing a subscriber's backhaul wide area network connection.

A wireless user device, also called User Equipment (UE), such as a cell phone or Smartphone, connects via the radio access point device to the wireless service provider's network. In a standard 3G system, the UE obtains its timezone information from the mobile switch center (MSC) in the wireless service provider's network. For macro cell towers, the location area code (LAC) included in the over-the-air (OTA) transmission from a macro cell tower can be used to differentiate the timezones and provide the appropriate timezone indicator to the UE. Radio access point devices, however, can be located in different time zones yet connect to the same gateway equipment, which in turn can connect to the same MSC. Consequently, the MSC needs to respond with a different timezone indicator to UE location requests sent via radio access point devices in different timezones.

Enterprise Femtos may be geographically distributed, which makes it difficult and sometimes undesirable to select a single unique LAC for all Femtos. For example, if Femtos are serviced by different regional gateways or are located in different time zones, a different LAC may be desired in order to optimize paging and in order to provide the correct time zone to a user terminal (UE). LAC assignment policies used for residential Femtos are not suitable for enterprise Femto developments because sometimes it is desirable for some enterprise Femtos to share the same LAC to minimize location updates for a roaming UE.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
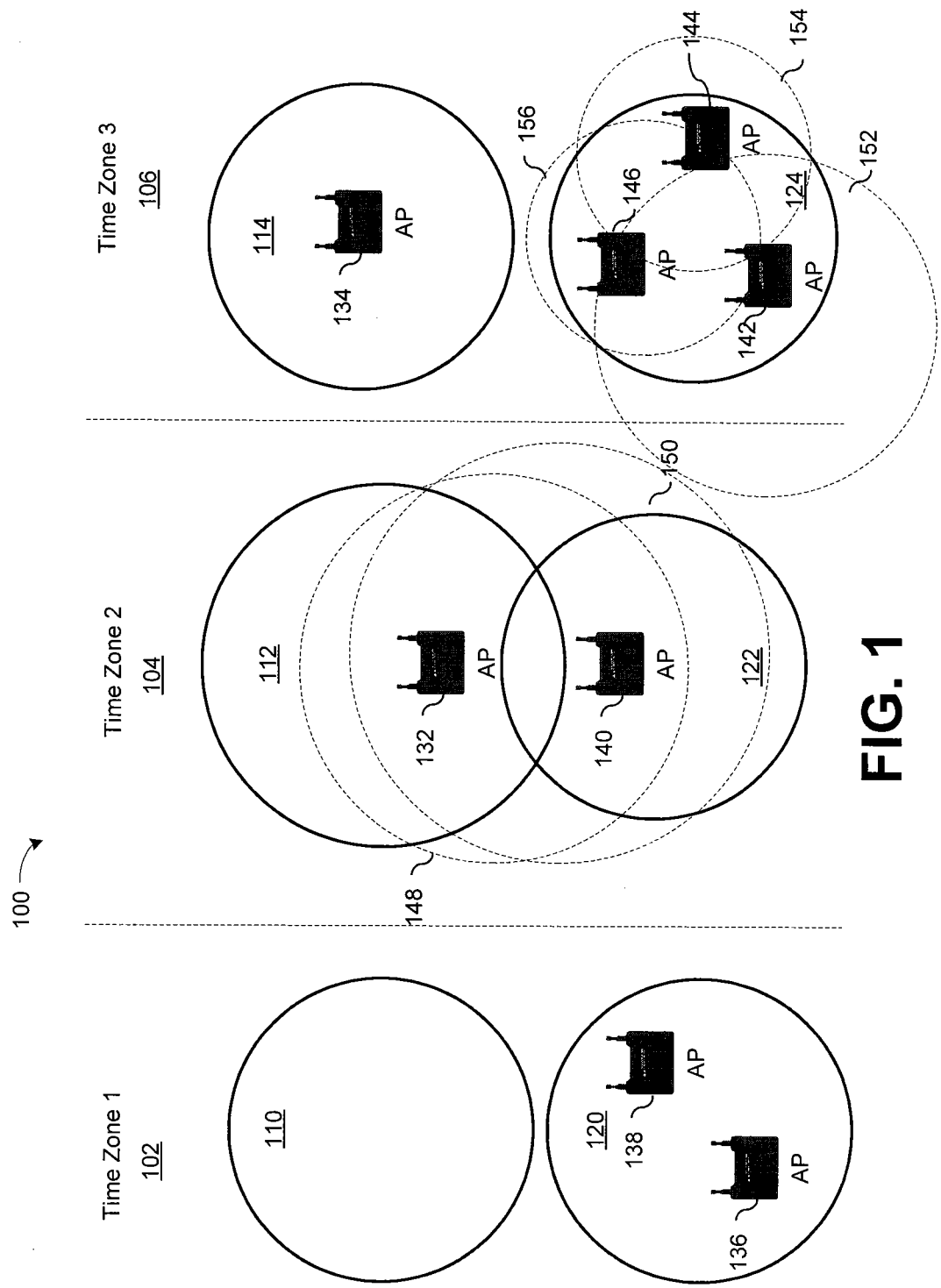
FIG. 1 is a diagram illustrating a simplified example of multiple enterprise networks upon which an example embodiment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface, and processing logic coupled with the interface. The processing logic receives via the interface a list of location area codes detected by an access point associated with a site group to be provisioned with a location area code (LAC). The processing logic removes from a predefined list of location area codes the location area codes detected by the access point. The processing logic selects a LAC from the predefined list for the site group after removing the location area codes detected by the access point. The processing logic provisions the access point with the selected LAC via the interface.

In accordance with an example embodiment, there is disclosed herein, a method comprising receiving data representative of neighboring femto access points detected from a first femto access point belonging to a new site group. The location of femto access points neighboring the first femto access point is determined. Location Access Codes (LACs) belonging to femto access points detected by the first femto access point are removed from a candidate LAC list. LACs associated with femto access points from neighboring site groups determined to be within a predefined proximity of the first femto access point are also removed from the candidate LAC list. A LAC for the new site group is selected from the candidate LAC list after removing from LACs from the list detected by the first femto access point and LACs from neighboring site groups determined to be within the predefined proximity of the first femto access point.

In accordance with an example embodiment, there is disclosed herein an apparatus comprising a first interface and processing logic coupled with the first interface. The processing logic is responsive to receiving a request for access for a user terminal from an access point via the interface to determine an enterprise network the user terminal is authorized to access. The processing logic determines an enterprise network associated with the access point. The processing logic obtains a list of Location Access Codes (LACs) associated with an enterprise network the user terminal is authorized to access responsive to determining the enterprise network the user terminal is authorized to access does not match the enterprise network associated with the access point. The processing logic sends a response to the user terminal via the interface, the response having data indicating that the user terminal is authorized to associate with the LAC associated with the access point but not authorized to associate with the access point responsive to determining a LAC on the list of LACs associated with the enterprise network the user terminal is authorized to access matches a LAC associated with the access point.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring to FIG. 1, there is illustrated a schematic block diagram 100 of multiple enterprise networks upon which an example embodiment may be implemented. In the illustrated example, the enterprise networks span three time zones 102, 104, and 106, those skilled in the art should readily appreciate that any physically number of times zones may be spanned by either network. For example the enterprise network with site groups 110, 112, 114 may span as few as one or more than three time zones. Similarly, the enterprise network comprising site groups 120, 122, 124 may span any number of time zones. The time zones illustrated in FIG. 1 were selected merely for ease of illustrating the example embodiments.

The number of access points (APs, which may also be referred to herein as femto APs or "FAPs" and/or Home Node B (HNBs) for each site group may vary. In the illustrated example, site group 110 has no access points. For example site group 110 may be a new site group which has not yet had an access point installed. An algorithm for selecting a LAC for a first access point in a site group will be described in further detail herein infra. Site group 112 has one AP 132 and site group 114 also has one AP 134. Site group 120 has two APs 136 and 138, while site group 122 has one AP 140, and site group 124 has three APs 142, 144, 146.

For illustrating some of the principles of the example embodiments described herein, coverage areas for some of the APs are also illustrated. For example, APs 132 and 140 have overlapping coverage areas as illustrated by 148 and 150 respectively. Similarly, the coverage areas APs 142, 144, 146 are illustrated as 152, 154, 156 respectively.

Figure 2:
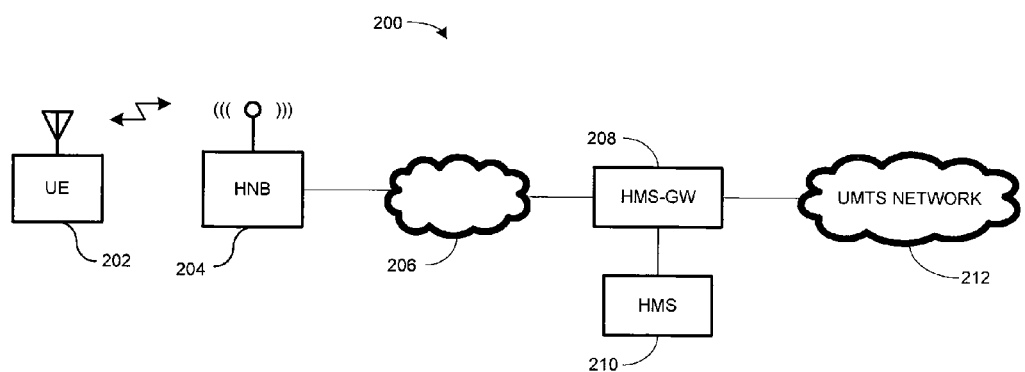
FIG. 2 is a block diagram illustrating a simplified example of a network for that may be coupled to one of the access points in FIG. 1.

FIG. 2 is a block diagram illustrating a simplified example of a network 200 that may be coupled with one of the access points in FIG. 1. Network 200 comprises a user terminal (UE) 202 that wirelessly communicates with an access point (which may also be referred to herein as a Hot Node B "HNB" or femto access point "FAP") 204. In this example, network 200 employing HNB 204 may be employed to implement any of one or more access points APs 132, 134, 136, 138, 140, 142, 144, 146 and illustrated how they are connected to a network. HNB 204 communicates with a gateway, which in this example is a HNB Management System "HMS" gateway or HMS-GW 208, via a network 206. In an example embodiment, HNB 204 communicates using a secure protocol such as IPsec to communicate with HNB-GW 208. HMS-GW 208 provides access to a network 212 (which in this example a Universal Mobile Telecommunications System (UMTS) network but network 212 may be any suitable type of network) for UE 202, provided UE 202 is authorized. HMS 210 is a network element that provides management services for the network and is coupled with HMS-GW 208.

In an example embodiment, HMS 210 determines a LAC when a new site group is created. In an enterprise environment, a problem that can occur is that another network may be using a conflicting LAC, or another gateway (HMS-GW) may also be using the same LAC. This problem arises because there are an insufficient number of LACs to give each site group a unique LAC, so some LAC reuse can be expected. When a HNB, such as HNB 204, is first added to a new site, the HNB performs a network listen (NWL) to detect neighboring access points. For example, in FIG. 1, AP 132 can detect AP 140 (which are in different site groups, while APs 142, 144, and 146 which are in the same site group can detect each other.

Figure 3:
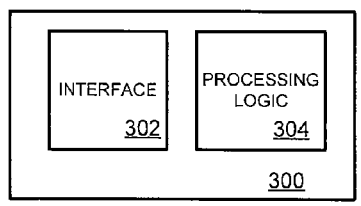
FIG. 3 is a block diagram of an apparatus for performing automatic LAC assignment in accordance with an example embodiment.

Referring to FIG. 3, with continued reference to FIGS. 1 and 2, there is illustrated an apparatus 300 suitable for determining a LAC for an AP such as HNB 204, APs 132, 134, 136, 138, 140, 142, 144, and/or 146. For example apparatus 300 may be employed to implement the functionality of HMS 210. Apparatus 300 comprises an interface 302 and processing logic 304 coupled with interface 302. "Logic", as used herein, includes but is not limited to hardware, firmware, software encoded in a non-transitory, tangible computer readable medium for execution by a processor and which performs the described functionality when executed by a processor, and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Figure 4:
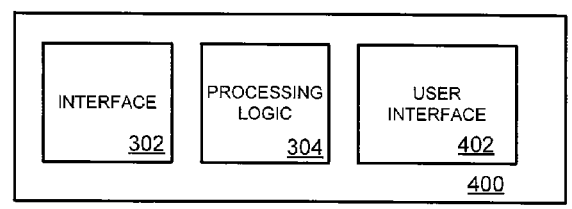
FIG. 4 is a block diagram of an apparatus for performing an automatic LAC assignment with a user interface.

In an example embodiment, HMS 300 is provisioned with a predefined list of location area codes (LACs) and/or data representative of a predefined list of candidate LACs. The predefined list may also be referred to herein as a "candidate list." In an example embodiment, the candidate list is received via interface 302. In another example embodiment, a user interface may be employed to obtain the candidate list. For example, referring to FIG. 4 with continued reference to FIGS. 1-3 there is illustrated an example embodiment where an apparatus 400 further comprises a User Interface 402 that can be employed for receiving a candidate list or data representative of a candidate list.

During initial deployment of a femto, the first access point, e.g., HNB 204, is provisioned with a LAC for a site group. HNB 204 performs a NWL and reports LACs of neighboring access points detected during the NWL. For example, if AP 132 is the new AP being installed, it would report detecting AP 140. HNB 204 reports the LACs for these access points to HMS 210. If the new AP being installed is AP 134, it would report detecting no APs. Processing logic 304 receives the LACs for access points detected by HNB 204 and removes the LACs detected by HNB 104 from the candidate list. Processing logic 304 selects a LAC from the candidate list for the site group after removing the location area codes detected by HNB 204. Processing logic 302 provisions HNB 204 with the selected LAC.

In an example embodiment, processing logic 304 randomly selects a LAC from the candidate list after removing the LACs detected by HNB 204. In another example embodiment, processing logic 304 is provisioned with a list of LACs in use by other enterprise networks and selects a LAC that is not in use by any other enterprise.

In yet another example embodiment, processing logic 304 maintains a list of location access codes used by other enterprise networks and selects the LAC by selecting a LAC that is used the least number of times. For example if site groups 114, 122 share the same LAC (e.g., LAC1), and site groups 120 and 124 share the same LAC (e.g., LAC2), and site group 112 is the only site group using a LAC (e.g., LAC3), then the new site group would be assigned LAC3.

In still yet another example embodiment, processing logic 304 selects a LAC that is currently used by a different site group, but at a location that should not interfere with LAC assignment for HNB 204. For example, for site group 110 the LAC assigned to site group 114 or site group 124 may be assigned.

In an example embodiment, processing logic 304 determines the location of HNB 204. In an example embodiment, processing logic 304 receives Global Positioning System (GPS) coordinates via interface 302. In another example embodiment, processing logic 304 determines a location for HNB 204 based on data received from HNB 204 indicating what access points HNB 204 detected.

In an example embodiment, processing logic 304 may use location data to determine undetected access points. For example, AP 140 may detect AP 132 but not AP 138. Processing logic 304 may determine from location data it has AP 138 is within a predefined proximity of HNB 204 (for example within x meters or in the case of AP 134 and AP 146 within same time zone). If AP 138 is undetected but within the predefined proximity, processing logic 304 removes the LAC for site group 120 from the candidate list before selecting a LAC for HNB 204.

In an example embodiment, processing logic 304 selects a predefined list of location area codes from a plurality of predefined list of location area codes for the HNB 204, and the site group based, on the location of the HNB 204. For example, processing logic 304 may employ different candidate lists based upon an area, building, campus, and/or time zone where HNB 204 is located. In an example embodiment, processing logic 304 selects a candidate list for the site group based from a plurality of candidate lists based on what gateway (such as HMS-GW 208) is assigned to the HNB 204.

In an example embodiment, when a second or subsequent access point, for example AP142 in FIG. 2, is added to the enterprise belonging to the same site group, processing logic 304 receives via interface 302 data from the access point to be added data representative of LACs the access point has detected. For example, the access point, such as AP 142, may perform a NWL, and then transmit the results to HMS 210. If HMS 210 does not detect any conflicting LACs, then processing logic 304, for example in HMS 210, assigns AP 142 to the same LAC as site group 122. If a conflict between LACs is detected, for example between APs 140 and 142, processing logic 304 removes the LAC for site group 122 form the candidate list and selects a new, second LAC for AP 142. Other members of the site group, such as APs 144, 146 are subsequently moved to the second LAC by processing logic 304.

Note that although APs 142, 144, 146 can detect each other, there is no conflict because they belong to the same site group and thus would have the same LAC. If site group 124 changes, then a conflict situation may exist. For example if site group 124 is split in half horizontally, where AP 146 belongs to a first site group and APs 142, 144 belong to a second site group, then AP 146 would conflict with APs 142, 144; however, APs 142, 144 would not conflict with each other.

In an example embodiment, the network may perform periodic re-adjustments. For example, each AP may perform a nightly NWL and report the results to its HMS, potentially at different times. The HMS verifies that the NWL did not detect any cells sites of other networks (or Macros) reporting the same LAC. If a new LAC has been queued up for the AP and it does not conflict with the NWL results, the AP is provisioned with the new LAC. If a LAC conflict is detected, then a more optimal enterprise LAC can be selected, which can be selected using the same algorithm described herein for adding a new site group. In one example embodiment, the access point detecting the conflict is immediately provisioned with the new LAC and the remaining members of the site group are provisioned as soon as possible.

For example, processing logic 304 sends an instruction via interface 302 to access points, e,g., APs 142, 144, 146, to listen (e.g. perform a NWL) for LACs in use by other access points. Processing logic 304 removes the first LAC from the candidate list responsive to receiving data from one of access points 142, 144, 146 via interface 302 indicating an access point from another network was detected using the same LAC. Processing logic 304 selects a second LAC for the site group after removing the first LAC from the predefined list. Processing logic 304 provisions the access point where the conflict was detected with the second LAC the interface 302.

In an example embodiment, the HMS may trigger a deeper assignment of LAC assignments by re-evaluating distances between Femto APs of different enterprises that re-use the same LAC and will attempt to find a better LAC for at least one of the enterprise network's site groups. In one embodiment, the HMS may perform an offline re-assignment of all LACs by iteratively selecting each Site Group (for example each of site groups 110, 112, 114 and/or 120, 122, 124) and assigning it a new LAC starting with all LACs available, and using the stored NWL data to identify which access points can detect other access points. This analysis can be performed periodically in a batch, offline mode, and can queue up new candidate LAC assignments to the Femtos during nightly re-adjustment. New LACs may be selected for site groups where there are no conflicts, a minimum number of conflicts, and/or where the conflicts between femtos are farthest apart.

For example, processing logic 304 may periodically performs iterations of assigning a new LAC to the site group and determining whether there are conflicts with the new LAC. Processing logic 304 selects an updated LAC for the site group that has a least number and/or no conflicts. Processing logic 304 provisions the access points in the site group with the updated LAC via interface 302.

In an example embodiment, if the candidate list is empty, a new Femto will not be enabled. An alarm may be issued indicating that additional LACs are needed to be assigned or that a LAC optimization (for example the nightly or periodic analysis described herein) should be performed. For example, if the candidate list is empty, processing logic 304 may send an automated email or text message via interface 302 to a pre-designated address, such as a device associated with a network administrator. As another example, processing logic 304 may output a warning message on user interface 402. In particular embodiments, processing logic 304 may automatically perform an optimization algorithm such as the iterative algorithm described herein.

As those skilled in the art can readily appreciate, even when using the LAC assignment algorithms described herein, LAC conflicts may not be completely avoided. For example, undiscovered neighboring enterprise networks may be using a LAC being used by an enterprise network. As a result a LAC conflict can occur. Two enterprise networks not within the vicinity of each other may use the same LAC. In both cases, a user (or user terminal "UE") is authorized in one enterprise but not in another. In an enterprise network employing femtos, if a UE is location updated rejected (LU rejected), it will not attempt to associate with the same LAC for a predetermined period of time, even if the UE roams back to its own enterprise where the LAC is valid.

For the aforementioned reasons, in an example embodiment described herein access denial is performed in a manner that will prevent a UE from receiving a LU rejection for a LAC that is valid on its own enterprise network (under the 3$^{rd}$ Gneration Partnership Project "3GPP" technical specification in effect as of the filing date of this application, 72 hours). In accordance with an example embodiment, the HMS gateway (HMS-GW, see e.g., HMS-GW 208 in FIG. 2) is provisioned with an access list. In particular embodiments, the access list, which may also be referred to in the art as an Access Control List or "ACL", is provided by the HMS (such as HMS 210 in FIG. 2). The access list may suitably comprise several lists, including but not limited to, 1) a list mapping Enterprise ID (identifier) to IMSI (International mobile subscriber identity), and a reverse mapping of IMSI to Enterprise ID. The access list may further include a list of LACs per Enterprise ID, a list of FAPs to Enterprise ID and a list of Enterprise IDs by FAP.

Figure 5:
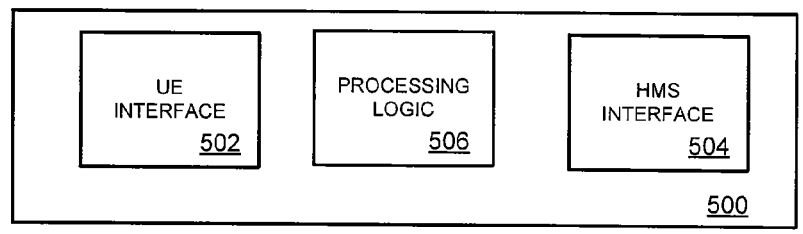
FIG. 5 is a block diagram of an apparatus for handling a LAC conflict for a user terminal (UE).

Referring now to FIG. 5 with continued reference to FIG. 2, there is illustrated an apparatus 500 that can be employed in a network, such as a Femto network in this example, for handling LAC conflicts for a user terminal, e.g. UE 202. For example, apparatus 500 is suitable for implementing HMS-GW 208. In the example embodiments described herein, apparatus 500 is employed for implementing HMS-GW 208; however, as those skilled in the art can readily appreciate, other configurations may be employed to implement HMS-GW 208.

Apparatus 500 comprises a UE interface 502 that is coupled with the UE. The UE interface may be coupled with one or more networks (such as network 206) and/or devices (such as HNB 204) for coupling with UE 202. HMS interface 504 is employed to communicate with the HMS for the enterprise network. Processing logic 506 receives data from a UE via UE interface 502, and receives data from the HMS via HMS interface 504 and performs the functionality described herein.

In an example embodiment, processing logic 506 is provisioned, or has access to, 1) a list of IMSI for each enterprise ID (Enterprise ID→IMSI list); 2) for each IMS a reverse mapping, e.g. for each IMSI a list of enterprise IDs (IMSI→Enterprise ID); 3) a list of LACs for each enterprise (Enterprise ID→LACs); 4) a list of FAPs for each enterprise (Enterprise ID→FAP); and 5) a list mapping FAP-ID to enterprise ID (FAP-ID→Enterprise-ID).

Based on an IMSI received from a user terminal (e.g. UE 202 in FIG. 2), processing logic 506 determines enterprise IDs authorized for the IMSI [e.g. list 2) above]. Based on the FAP where the request was received (e.g. HNB 204 in FIG. 2), determine which enterprise the FAP belongs to based on the FAP-ID to enterprise ID list [list 5) above]. If the enterprise ID for the HNB that received the request matches an enterprise ID that the IMSI is authorized, processing logic 506 determines that the UE is authorized.

If the enterprise ID associated with the IMSI does not match the enterprise ID associated with the FAP, the IMSI is not authorized. Processing logic 506 then obtains a LAC list for the enterprise ID(s) associated with the IMSI. If the LAC for the HNB receiving the request does not overlap with a LAC for the enterprise associated with the IMSI, then processing logic 506 sends a LU rejection via interface 502 to the UE.

If there is a match for the LAC receiving the request from the UE and the LAC on the enterprises associated with the UE, then an overlap has occurred and processing logic 506 sends an alternate rejection. For example, a predefined non-LU reject may be employed. In an example embodiment, processing logic 506 sends a UE authentication failure (as opposed to a LU reject) to indicate to the LU that the LAC is a valid LAC for the UE but the HNB that the US is currently accessing belongs to another enterprise network.

Figure 6:
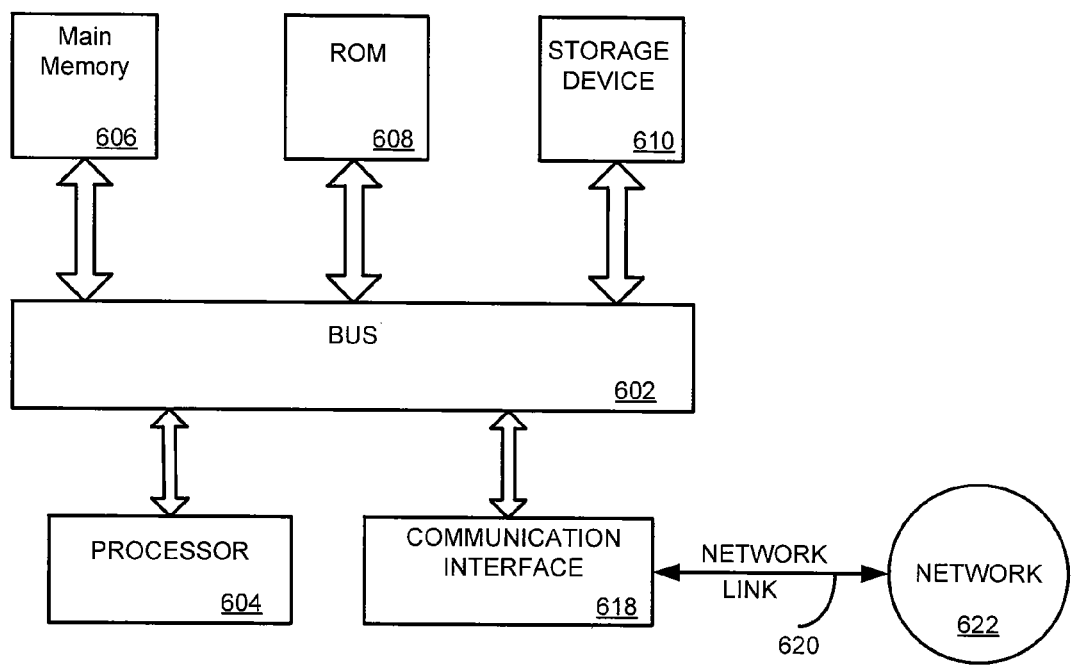
FIG. 6 is a block diagram illustrating an example of a computer system upon which an example embodiment may be implemented.

FIG. 6 is a block diagram that illustrates a computer system 600 upon which an example embodiment may be implemented. For example, computer system 600 may be employed to implement processing logic 304 (FIGS. 3 and 4) and/or processing logic 506 (FIG. 5).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

An aspect of the example embodiment is related to the use of computer system 600 for automatic LAC assignment and/or perform error handling for a UE. According to an example embodiment, automatic LAC assignment and/or perform error handling for a UE is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling computer system 600 to a network link 620 that is connected to a local network 622. In particular embodiments, computer system 600 may include a plurality of interfaces 618 coupled to a plurality of networks. For example, a first computer interface 618 may be coupled to a network coupling computer system 600 with one or more femto APs, and a second computer interface 618 may be coupled with a UMTS. Wireless links may also be implemented. In any such implementation, communication interface 618 sends and receives electrical, electromagnetic, or optical signals that carry digital data streams representing various types of information.

In view of the foregoing structural and functional features described above, a methodology in accordance with an example embodiment will be better appreciated with reference to FIGS. 7-10. While, for purposes of simplicity of explanation, the methodologies of FIGS. 7-10 are shown and described as executing serially, it is to be understood and appreciated that the example embodiment are not limited by the illustrated orders, as some aspects could occur in different orders and/or concurrently with other aspects from that shown and described herein. Moreover, not all illustrated features may be required to implement any of the methodologies described herein. The methodologies described herein are suitably adapted to be implemented in hardware, software (which performs the functionality described herein when executed by a processor), or a combination thereof.

Figure 7:
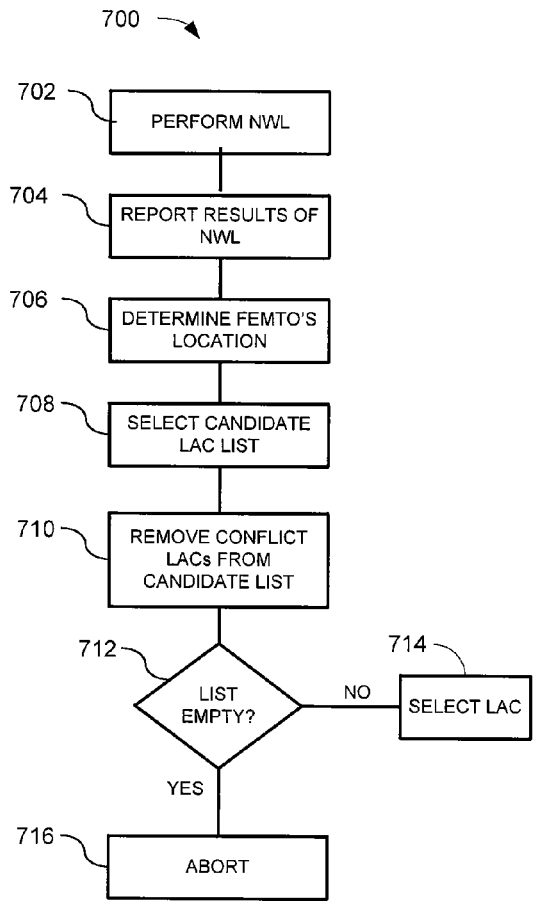
FIG. 7 is a block diagram illustrating an example methodology for a assigning a LAC for initial deployment of a site group.

FIG. 7 is a block diagram illustrating an example methodology 700 for a assigning a LAC for initial deployment of a site group. Methodology 700 may be implemented by HMS 210 in FIG. 2, processing logic 304 in FIG. 3, and/or processor 604 in FIG. 6.

At 702, the first femto access point (FAP) to be configured for the site group is instructed to perform a network listen (NWL). This allows the HMS to determine whether any FAPs from the same enterprise network, or other enterprise networks, may conflict.

At 704, the first FAP reports the results of the NWL. In an example embodiment, the results include FAPs belonging to different enterprise networks, and in particular embodiments, the results may include FAPs detected belonging to the same enterprise network.

At 706, the HMS determines the location of the FAP. For example, the HMS may request GPS data from the FAP. In particular embodiments, the HMS also maintains a data comprising the location of other FAPs belonging to the enterprise network.

At 708, the HMS selects a candidate LAC list. In an example embodiment, a HMS may employ different candidate LAC lists for different locations, for example different candidate LAC lists for each time zone.

At 710, conflicting LACs are removed from the candidate LAC list. A conflicting LAC may include LACs discovered by the FAP during a NWL, and/or LACs determined to be within a predefined proximity of the site group (e.g. within same zone and/or within a predefined distance).

At 712, a determination is made whether the candidate list is empty. If the LAC list is not empty (NO), at 714, a LAC is selected. Any suitable means may be employed for selecting a LAC. For example, a LAC may be selected randomly, a LAC may be selected that is not (known to) being used by any other enterprise network, a LAC may be selected where the FAPs are the farthest distance away from each other (for example in FIG. 1 site groups 114 and 120 may be provisioned with the same LAC), or a LAC used by the same enterprise network where the possibility of conflict is low (for example in FIG. 1 site groups 120 and 124 which are two time zones away from each other), and/or any combination of the aforementioned techniques.

If at 712, a determination is made that the LAC list is empty (YES), the new femto does not get enabled. Additional action may also be taken. For example an alarm may be issued (e.g. an email message to an administrator and/or a audio, visual or audiovisual signal is output on a user interface such as user interface 402 in FIG. 4). Alternatively, an optimization algorithm such as is described herein supra and/or in FIG. 9 infra may be executed to perform a LAC rearrangement.

Figure 8:
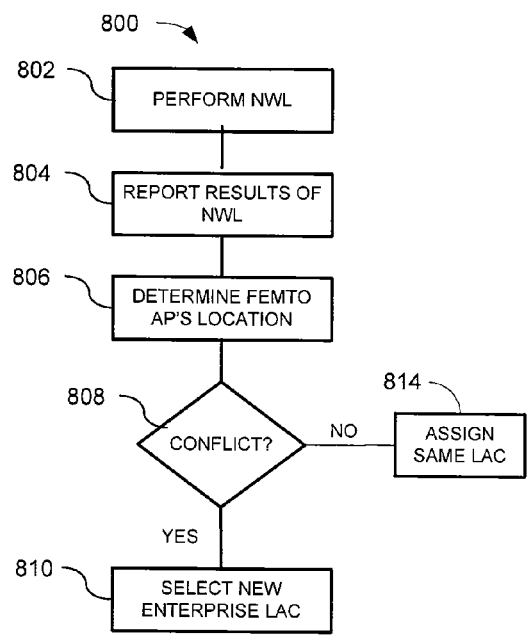
FIG. 8 is a block diagram illustrating an example methodology for adding a new access point to the site group.

FIG. 8 is a block diagram illustrating an example methodology 800 for adding a new femto access point (FAP) to the site group. Methodology 800 may be implemented by HMS 210 in FIG. 2, processing logic 304 in FIG. 3, and/or processor 604 in FIG. 6.

At 802, the new HMS instructs the new FAP to perform a NWL to detect neighboring LACs. In an example embodiment, the FAP may ignore FAPs belonging to the same site group. At 804, the HMS receives data representative of the LACs detected by the FAP.

At 806, the HMS determines the FAPs location. The location may be determined by any suitable means. For example, the HMS may receive data representative of GPS coordinates from the FAP. The HMS may determine the FAPs location based on which LACs and/or FAPs are detected by the FAP. As yet another example, the HMS may determine the location of the FAP based on the location of one or more neighboring FAPs.

At 808, the HMS determines whether the new FAP detected a conflict. If no conflict was detected (NO), the FAP is assigned the same LAC as the rest of the site group.

If at 808, the HMS determines a conflict exists between the new FAP and the LAC belonging to the site group (YES), at 810 a new enterprise site group is selected. In an example embodiment, the HMS initiates an algorithm similar to the algorithm described in FIG. 7 described herein supra. In particular embodiments, the new FAP is assigned a new LAC while the remaining FAPs in the site group remain with the original FAP until the HMS can change their LACs. In yet another example embodiment, the HMS may execute an algorithm similar to algorithm 900 described in FIG. 9 infra.

Figure 9:
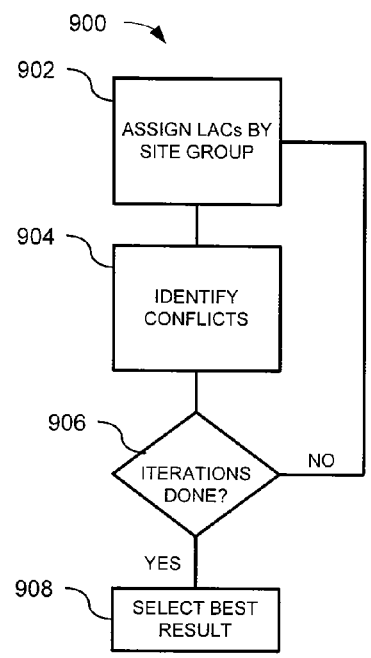
FIG. 9 is a block diagram illustrating a methodology for iteratively selecting a LAC.

FIG. 9 is a block diagram illustrating a methodology 900 for iteratively selecting a LAC. Methodology 900 may be implemented by HMS 210 in FIG. 2, processing logic 304 in FIG. 3, and/or processor 604 in FIG. 6.

At 902, each site group is assigned a LAC. For example, LACs may be assigned iteratively for each site group with all LACs being available.

At 904, conflicts between LACs/FAPs are identified. For example, conflicts may be identified by using results from NWLs performed by the FAPs and/or location data.

At 906, if there are more iterations to be performed (NO), at 902 a new LAC assignment is selected for the site groups, and at 904 conflicts are identified.

If at 906 the iterations are completed (YES), at 908 the iteration with the best results is selected. Any suitable technique for selecting results can be employed. For example, the best results may be any result where there are no conflicts. As another example, the best results may be where the distance between conflicting LACs is the largest.

In an example embodiment, methodology 900 may be executed periodically in a batch offline mode. For example nightly or weekly. Once new LAC assignments are selected, the HMS may queue up the new candidate LAC assignments. For example, the new LAC assignments may be performed during a nightly re-adjustment period.

Figure 10:
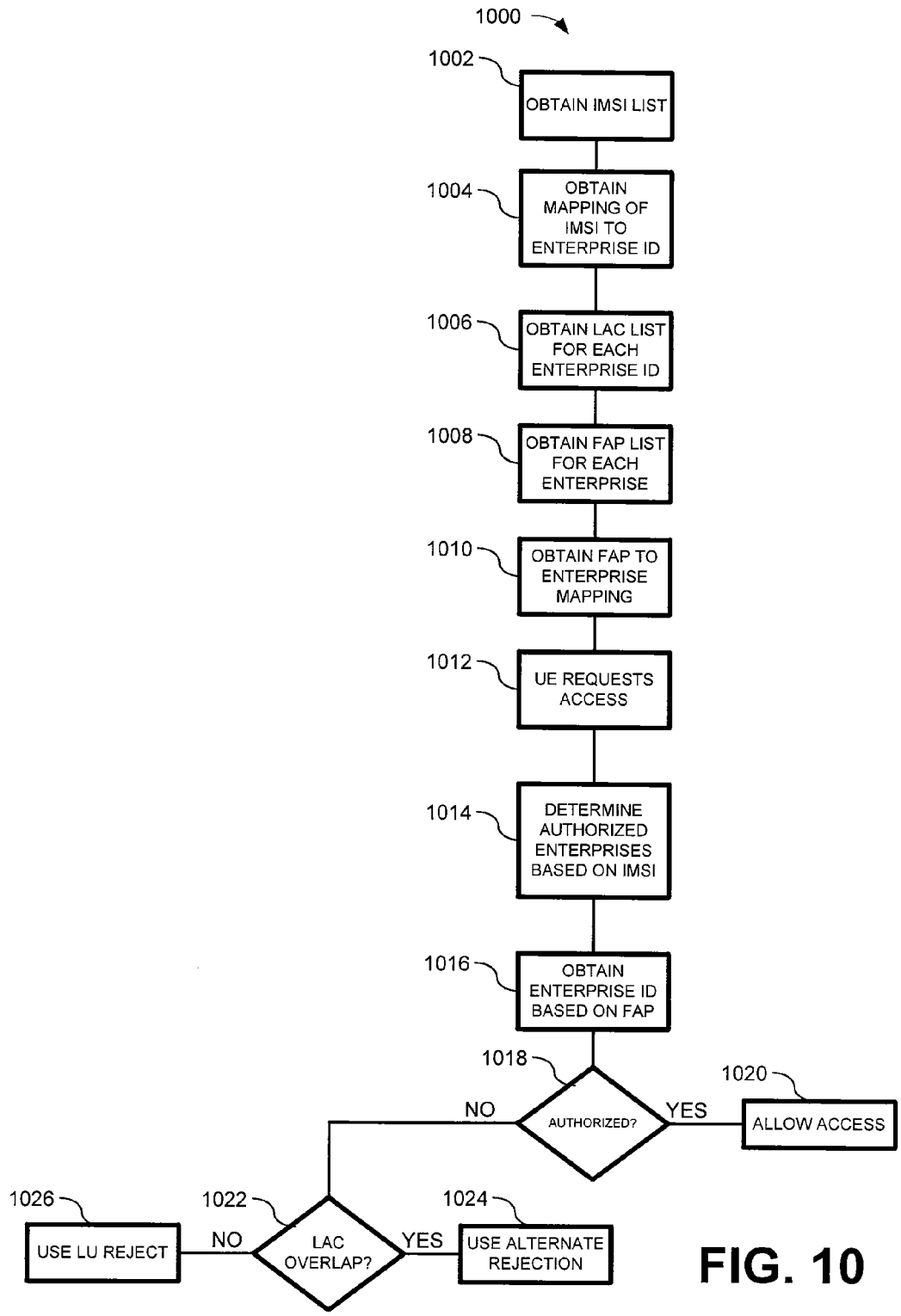
FIG. 10 is a block diagram illustrating an example of a methodology for handling a LAC conflict for a user terminal.

FIG. 10 is a block diagram illustrating an example of a methodology 1000 for handling a LAC conflict for a user terminal. Methodology 1000 may be implemented by HMS-GW 208 in FIG. 2, processing logic 506 in FIG. 5, and/or processor 604 in FIG. 6.

At 1002, a mapping of enterprises to IMSI is obtained. For example, the list could contain for each enterprise, a list of valid IMSI's for the enterprise. The list may be provisioned to the device performing the methodology (e.g. HMS-GW 208) or may be made available to the device via a communication interface (for example the list may be made available to HMS 210 in FIG. 2).

At 1004, a mapping of IMSI to enterprise is obtained. This list is the reverse of the list obtained in 1002. For example, for each IMSI, what enterprise networks the IMSI authorized to access.

AT 1006, a list is obtained for each enterprise that lists valid LACs for each enterprise. For example, for a first enterprise, LACs 1001 and 1002 are valid, for a second enterprise LACs 1003-1010 are valid, etc.

At 1008, a FAP list is obtained for each enterprise. This list contains the list of each FAP associated with an enterprise, for example, for a first enterprise, FAP1 and FAP2 are valid, etc.

At 1010, a list is obtained that maps each FAP (or FAP ID) to an enterprise. This list is the reverse of the list obtained in 1008. In this list, given a FAP ID, a determination can be made as to which enterprise the FAP is associated.

At 1012, a request for access is received from a user terminal. The request would be received via FAP.

At 1014, a list of enterprises that the user terminal is authorized to access is obtained. The list can be based on the IMSI associated with the user terminal.

At 1016, the enterprise ID associated with the FAP is determined. This may be accomplished by looking up the FAP ID of the access point that forwarded the request.

At 1018 a determination is made whether the user terminal is authorized to access the enterprise network associated with the FAP. If the user terminal is authorized (YES), access is granted as illustrated by 1020.

If at 1018 a determination is made that the user is not authorized to access the FAP (NO), at 1022, a determination is made whether the problem was caused by a LAC overlap (e.g. the LAC associated with the FAP matches a LAC on the enterprise the user terminal is authorized to access). If the problem was caused by a LAC overlap (YES), at 1024 an alternative (to a LU) rejection is sent. For example the rejection may contain data that indicates the user terminal is authorized for the LAC but not the particular FAP. As another example, the alternative rejection may be a user authorization rejection (as opposed to a LU rejection).

If at 1022, a determination is made that the authorization failure was not caused by LAC overlap (NO), at 1026 a LU rejection is sent. In this case a LU rejection is appropriate because the user terminal is not authorized to use the LAC on any network. In an example embodiment, where the user terminal maintains an access list, the user terminal removes the LAC from its access list for at least a predefined time period (e.g. at least 72 hours).

Although the example embodiments described herein are directed to a network employing femto cells, those skilled in the art should readily appreciate that the principles described herein may be applicable to any network that provisions access points with location access codes are a similar type of codes. Femto cells provide well defined terms to those skilled in the art. Thus, this disclosure should be construed as limited to a network with femto cells.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an interface;
processing logic coupled with the interface;
wherein the processing logic receives via the interface a list of location area codes detected by an access point associated with a site group to be provisioned with a location area code (LAC);
wherein the processing logic removes from a predefined list of location area codes the location area codes detected by the access point;
wherein the processing logic uses location data to determine whether undetected access points belonging to another network are within a predefined proximity of the access point to be provisioned with a LAC;
wherein the processing logic removes location area codes assigned to the undetected access points belonging to another network within the predefined proximity of the access point from the predefined LAC list;
wherein the processing logic selects a LAC from the predefined list for the site group after removing the location area codes detected by the access point and after removing location area codes assigned to the undetected access points belonging to another network within the predefined proximity of the access point from the predefined LAC list; and
wherein the processing logic provisions the access point with the selected LAC via the interface.

2. The apparatus of claim 1, wherein the processing logic selects a LAC by randomly selects the LAC from the predefined list after removing the location codes detected by the access point.

3. The apparatus of claim 1, wherein the processing logic selects the LAC by selecting a LAC that is not in use by any other enterprise.

4. The apparatus of claim 1, wherein the processing logic maintains a list of location access codes used by other enterprise networks; and
wherein the processing logic selects the LAC by selecting a LAC that is used a least number of times.

5. The apparatus of claim 1, wherein the processing logic selects the LAC by selecting a LAC that is currently used by a different site group within a same enterprise at a location that should not interfere with the LAC assignment for the access point.

6. The apparatus of claim 1, wherein the processing logic determines a location of the access point.

7. The apparatus of claim 6, wherein the processing logic determines the location of the access point based on a global positioning system.

8. The access point of claim 6, wherein the processing logic determines the location of the access point based on the list of location area codes detected by the access point.

9. The access point of claim 6, wherein the processing logic selects a predefined list of location area codes from a plurality of predefined list of location area codes for the site group based on the location of the access point.

10. The access point of claim 1, wherein the processing logic selects a predefined list of location area codes from a plurality of predefined list of location area codes for the site group based on a gateway assigned to the access point.

11. The apparatus of claim 1, wherein the processing logic receives via the interface a list of location area codes detected by a second access point associated with the site group to be provisioned with a LAC; and
 wherein the processing logic assigns the LAC to the second access point responsive to determining from the list of location area codes detected by the second access point that no access point not belonging to the site group is using the selected LAC.

12. The apparatus of claim 1, wherein the processing logic receives via the interface a list of location area codes detected by a second access point associated with the site group to be provisioned with a LAC; and
 wherein the processing logic assigns a second LAC to the second access point responsive to determining from the list of location area codes detected by the second access point that an access point not belonging to the site group is using the selected LAC.

13. The apparatus of claim 12, wherein the processing logic re-assigns other members of the site group the second LAC responsive to determining from the list of location area codes detected by the second access point that an access point not belonging to the site group is using the selected LAC.

14. The apparatus of claim 1, wherein the processing logic sends an instruction via the interface to the access point to listen for location area codes in use by other access points; and
 wherein the processing logic removes from the predefined list the selected, first, LAC responsive receiving data from the access point via the interface indicating an access point from another network was detected using the same LAC; and
 wherein the processing logic selects a second LAC for the site group after removing the first LAC from the predefined list; and
 wherein the processing logic provisions the access point with the second LAC via the interface.

15. The apparatus of claim 1, wherein the processing logic periodically performs iterations of assigning a new LAC to the site group and determining whether there are conflicts with the new LAC; and
 wherein the processing logic selects an updated LAC for the site group that has a least number of conflicts; and
 wherein the processing logic provisions the access point with the updated LAC via the interface.

16. The apparatus of claim 1, wherein the access point is a femto access point.

17. The apparatus set forth in claim 1, further comprising:
 the processing logic receives, via the interface, data indicating a new access point is being added to a site group;
 the processing logic sends a request to the new access point via the interface for the new access point to perform a network listen and report LACs that are being used by other networks;
 the processing logic receives a response to the request;
 the processing logic determines whether a conflict exists between a LAC detected by the new access point and a LAC assigned to the site group;
 the processing logic assigns the new access point a new LAC responsive to determining a conflict exists between a LAC detected by the new access point and the LAC assigned to the site group while the remaining members of the site group continue to use the LAC assigned to the site group.

18. A method, comprising:
 receiving data representative of neighboring femto access points detected from a first femto access point belonging to a new site group;
 determining location of femto access points associated neighboring the first femto access point;
 removing from a candidate location access code (LAC) list, LACs belonging to femto access points detected by the first femto access point;
 removing from the candidate LAC list femto access points associated with neighboring site groups determined to be within a predefined proximity of the first femto access point;
 determining, from location data, whether there are undetected access points belonging to another network within a predefined proximity of the access point to be provisioned with a LAC;
 removing location area codes assigned to the undetected access points belonging to another network within the predefined proximity of the access point from the predefined LAC list; and
 selecting a LAC for the new site group from the candidate LAC list after removing from LACs from the list detected by the first femto access point and LACs determined to be within the predefined proximity of the first femto access point and after removing location area codes assigned to the undetected access points belonging to another network within a predefined proximity of the access point from the predefined LAC list.

19. The method of claim 18, further comprising:
 receiving data representative of neighboring femto access points detected from a second femto access point belonging to a new site group;
 determining location of femto access points neighboring the second femto access point;
 determining whether a conflict is detected between neighboring femto access points detected by the second femto access point based on whether the second femto access point detected a femto access point using the same LAC as the new site group;
 determining whether a conflict exists between neighboring access points responsive to determining a femto access point belonging to another site group is using the same LAC and is within a predefined proximity of the second femto access point; and
 provisioning the second femto access point with the selected LAC responsive to determining no conflicts were detected.

20. The method of claim 18, further comprising
periodically assigning each site group a new LAC from the candidate LAC list;
determining whether any conflicts exists with the new LAC assigned to each site group;
iteratively assigning each site group another LAC from the candidate LAC list;
determining whether any conflicts exist after assigning each site group the another LAC; and
selecting LAC assignments for the site groups based upon determining which LAC list assignment has the least conflicts.

21. An apparatus, comprising:
an interface;
processing logic coupled with the interface;
wherein the processing logic is responsive to receiving a request for access for a user terminal from an access point via the interface to determine a first enterprise network the user terminal is authorized to access;
wherein the processing logic determines a second enterprise network associated with the access point;
wherein the processing logic obtains a list of Location Access Codes (LACs) associated with the first enterprise network the user terminal is authorized to access responsive to determining the first enterprise network the user terminal is authorized to access does not match the second enterprise network associated with the access point;
wherein the processing logic selectively sends a first response to the user terminal via the interface with data indicating that the user terminal is authorized to associate with a first LAC associated with the access point but not authorized to associate with the access point responsive to determining a LAC on the list of LACs associated with the first enterprise network the user terminal is authorized to access matches the first LAC associated with the access point; and
wherein the processing logic selectively sends a second response to the user terminal via the interface with data indicating that the user terminal is not authorized to associate with the first LAC associated with the access point responsive to determining no LAC on the list of LACs associated with the first enterprise network the user terminal is authorized to access matches the first LAC associated with the access point.

22. The apparatus of claim 21, wherein the response sent by the processing logic is an authentication failure message.

23. The apparatus of claim 21, wherein the processing logic is responsive to receiving a second request for access for a second user terminal from the access point via the interface to determine an enterprise network the user terminal is authorized to access;
wherein the processing logic obtains a list of Location Access Codes (LACs) associated with an enterprise network the user terminal is authorized to access responsive to determining the enterprise network the user terminal is authorized to access does not match the enterprise network associated with the access point;
wherein the processing logic sends a LAC update rejection to the second user responsive to determining there is not a LAC on the list of LACs associated with the enterprise network the user terminal is authorized to associate matching the LAC of the access point.

24. The apparatus of claim 21, further comprising a second interface;
wherein the processing logic obtains the list of enterprise networks the user terminal is authorized to access, and the list of Location Access Codes (LACs) associated with enterprise networks the user terminal is authorized to access via the second interface.

* * * * *

UNITED STATES PATENT AND TRADEMARK OFFICE
CERTIFICATE OF CORRECTION

PATENT NO. : 8,731,536 B2  
APPLICATION NO. : 12/900437  
DATED : May 20, 2014  
INVENTOR(S) : Rajesh Pazhyannur, Anton Okmyanskiy and Mickael Graham Page 1 of 1

It is certified that error appears in the above-identified patent and that said Letters Patent is hereby corrected as shown below:

IN THE SPECIFICATION:

Column 1, line 50, "examples" should be "example".

Column 1, line 56, delete "for".

Column 3, line 24, "physically" should be "physical".

Column 3, line 33, after "(HNBs), insert a -- ) --; should read as "(HNBs))".

Column 4, line 59, delete "104" and replace it with "204".

Column 4, line 62, delete "302" and replace it with "304".

Column 5, line 45, "FIG. 2" should be "FIG. 1".

Column 5, line 55, "form" should be "from".

Column 6, line 25, after "LAC", insert -- via --.

Column 7, line 12, "Gneration" should be "Generation".

Column 8, line 11, "US" should be "UE".

Column 9, line 61, delete "a".

Column 11, line 34, "LACs 1001 and 1002" should be "LAC1 and LAC2".

Column 11, line 35, "1003 1010" should be "LAC1 - LAC3".

IN THE CLAIMS:

Column 12, line 55, "selects" should be "selecting".

Signed and Sealed this  
Tenth Day of February, 2015

Michelle K. Lee  
*Deputy Director of the United States Patent and Trademark Office*